(12) United States Patent
Makino et al.

(10) Patent No.: US 6,552,130 B1
(45) Date of Patent: Apr. 22, 2003

(54) RESIN COMPOSITION

(75) Inventors: Takayuki Makino, Otake (JP); Toshio Takemoto, Otake (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 09/869,292

(22) Filed: Jul. 18, 2001

(30) Foreign Application Priority Data

Nov. 19, 1999 (JP) ............................................ 11-329644

(51) Int. Cl.[7] ........................ C08L 33/06; C08L 37/00; C08F 265/04
(52) U.S. Cl. ...................... 525/222; 525/221; 525/227; 525/263; 525/273; 525/279; 525/330.3; 525/330.5; 525/259; 526/217; 526/220
(58) Field of Search ................................. 525/222, 221, 525/227, 263, 273, 279, 329.9, 330.3, 330.5, 259; 526/217, 220

(56) References Cited

U.S. PATENT DOCUMENTS

| 4,159,301 A | * | 6/1979 | Buser et al. |
| 4,806,600 A | * | 2/1989 | Kano et al. |
| 5,412,047 A | * | 5/1995 | Geirges et al. |
| 6,191,229 B1 | * | 2/2002 | Sasabe et al. |

FOREIGN PATENT DOCUMENTS

| JP | 60-103065 | 6/1985 |
| JP | 63-83007 | 4/1988 |
| JP | 63-91307 | 4/1988 |
| JP | 7-149809 | 6/1995 |
| JP | 7-165847 | 6/1995 |
| JP | 8-109212 | 4/1996 |

* cited by examiner

Primary Examiner—James J. Seidleck
Assistant Examiner—Olga Asinovsky
(74) Attorney, Agent, or Firm—Oblon, Spivak, McClelland, Maier & Neustadt, P.C.

(57) ABSTRACT

A resin composition comprising (A) a (meth)acrylic acid ester (B) and an acrylic polymer soluble in the component (A) and further (C) a compound having a mercapto group (—SH) and a carboxyl group (—COOH) in the molecule or an component (C) and (F) an organic amine or an component (F) and (G) a radical trapping agent. The composition is suitably used as a covering material for civil engineering and construction applications.

18 Claims, No Drawings

RESIN COMPOSITION

DESCRIPTION

1. Technical Field

The present invention relates to a resin composition. The resin composition of the present invention is particularly suitably used as a covering material for civil engineering and construction applications.

2. Background Art

As resins used for coating and covering concrete, asphalt, and other road surfaces or floor or wall surfaces, epoxy-based resins, acrylic resins, etc. are known. Epoxy-based resins, however, have the defects that they are difficult to coat thickly with a single coating step and are weak in durability, slow in curing speed, and long in application time.

On the other hand, acrylic resin syrups can be coated thickly by a single coating step, are short in curing time, and are superior in durability as well. As polymerization initiators for polymerizing acrylic resin syrups, for example, Japanese Examined Patent Publication (Kokoku) No. 1-21343 discloses a redox-type polymerization initiator comprised of an organic peroxide and a tertiary amine for use for a wall coating or road marking composition. When using a redox-type polymerization initiator comprised of an organic peroxide and a tertiary amine for such an acrylic resin syrup, however, there are the problems that since an amine is used as a co-catalyst, the weathering resistance is poor and the cured covering yellows along with aging.

Further, Japanese Unexamined Patent Publication (Kokai) No. 6-33020 discloses an adhesive composition comprised of an organic peroxide, a dithiosalicylic acid as a curing promoter, N,N-dimethylbenzylamine, and a copper compound as a polymerization initiator. In this case as well, however, since an amine and a copper compound are used, there was the problem of yellowing of the cured covering. In this way, it was difficult to practically apply a covering material using an acrylic resin syrup in civil engineering and construction applications.

As a method for solving this problem, for example, Japanese Examined Patent Publication (Kokoku) No. 50-22586 discloses use of a polymerization initiator comprised of a peroxide, a sulfur compound, a metal compound, and water as a polymerization initiator for an acrylic resin syrup, Japanese Unexamined Patent publication (Kokai) No. 62-43408 discloses use of a radical polymerization initiator, a reducing substance containing sulfur in its molecule, a hydrohalide of an amine or a quaternary ammonium halide, and a copper-containing compound in the production of methyl methacrylate-based polymer, and Japanese Unexamined Patent Publication (Kokai) No. 63-186705 discloses use of peroxy esters, mercaptans, organic amines, and a metal complex of a metal selected from tin, aluminum, and antimony and an organic compound such as acetylacetone in the production of a vinyl-based polymer. Further, Japanese Examined Patent Publication (Kokoku) No. 4-81611 discloses a composition including a curing agent for curing a polymerization monomer at ordinary temperature in a short time comprised of a half ester of a bifunctional acid and a salt of sulfinic acid and strongly bonding human hard tissue and metal.

The polymerization initiators able to be used in these methods, however, are effective in suppressing yellowing of the cured coverings along with aging, but when added to an acrylic resin syrup, cause quick thickening to a certain extent at room temperature and therefore make practical use for civil engineering and construction applications requiring a long pot life (application time) difficult. Further, for applications requiring curing in a short time, for example, in the case where there is a quick curing ability such as in the two-pack spray type coating method mixing the initiator and promoter right before coating, an instantaneous quick curing ability cannot be obtained. Further, at low temperature regions, a slowing of the curing time and a fall in the curing ability are observed, so practical use is not yet possible at the present.

On the other hand, Polymer Communications (Vol. 30, pp. 136 to 138 (1989) discloses using a redox initiator of a peroxomonosulfate and thiomalic acid to polymerize acrylonitrile in an aqueous solution, Makromol. Chem. (Vo. 179, pp. 295 to 300 (1978)) discloses to use a redox initiator of potassium peroxodisulfide and a thioglycolic acid to polymerize an acryloamine in an aqueous solution, J. Macromol. Sci. (a-12(9), pp. 1275 to 1281 (1978)) discloses to use a redox initiator of ammonium peroxodisulfide and thiolactic acid (2-mercaptopropionic acid) to polymerize a methacrylamide in an aqueous solution, and J. Polym. Sci. (Vol. 21, pp. 2665 to 2674 (1983)) discloses to use a redox initiator of potassium peroxodisulfide and thiomalic acid to polymerize methyl methacrylate in an aqueous solution.

These prior art documents, however, relate to aqueous radical polymerization with a redox of a water soluble peroxide and a thio compound. Therefore, it would be difficult to use such a polymerization initiator for the above civil engineering and construction applications where the resin is covered by bulk polymerization by only the monomer without using a solvent.

DISCLOSURE OF THE INVENTION

The present invention has as its object to provide a resin composition which solves the problem in the prior art described above, gives a cured covering excellent in weathering resistance and low in yellowing, enabling control of the pot life (application time), and suitable for civil engineering and construction applications such as coating and covering concrete, asphalt, or other road surfaces or floor or wall surfaces.

The present inventors engaged in intensive studies to achieve the above object and as a result discovered that by using as a polymerization initiator for curing an acrylic resin syrup a compound including a mercapto group (—SH) and carboxyl group (—COOH) in a molecule or a combination of this with an organic amine or a combination of an organic amine with a radical trapping agent, the above object can be achieved, and thereby completed the present invention.

That is, the present invention provides a resin composition which comprises (A) a (meth)acrylic acid ester,
(B) an acrylic polymer soluble in the component (A), and
(C) a compound having a mercapto group (—SH) and a carboxyl group (—COOH) in the molecule, wherein
 the proportion of the component (A) is 40 to 90 parts by mass, the proportion of the component (B) is 10 to 60 parts by mass, and the proportion of the component (C) is 0.05 to 10 parts by mass based on 100 parts by mass of the total of these component (A) and component (B) (hereinafter also referred to as the "the resin composition (I) of the present invention").

The present invention further provides a resin composition which comprises:
(A) a (meth)acrylic acid ester,
(B) an acrylic polymer soluble in the component (A),
(C) a compound having a mercapto group (—SH) and a carboxyl group (—COOH) in the molecule, and
(F) an organic amine (hereinafter also referred to as "the resin composition (II) of the present invention").

The present invention further provides a resin composition which comprises:
(A) a (meth)acrylic acid ester,
(B) an acrylic polymer soluble in the component (A),
(F) an organic amine, and
(G) a radical trapping agent (hereinafter also referred to as "the resin composition (III) of the present invention").

BEST MODE FOR CARRYING OUT THE INVENTION

In the present invention, the "pot life" means the time from when starting to mix and stir the resin composition of the present invention to when stirring becomes impossible due to a rise in the viscosity, while the "curing time" means the time until the surface of the cured covering of the resin composition of the present invention becomes completely tack free.

Further, "(meth)acrylic acid ester" means an acrylic acid ester and/or a methacrylic acid ester, a "(meth)acrylic polymer" means an acrylic polymer and/or a methacrylic polymer, while a "(meth)acrylate" means an acrylate and/or a methacrylate.

In the resin composition of the present invention, the (meth)acrylic acid ester used as the (A) component is not particularly limited. As specific examples of a (meth) acrylic acid ester useful as the (A) component, an acrylic acid ester such a methyl acrylate, ethyl acrylate, n-butyl acrylate, t-butyl acrylate, and 2-ethylhexyl acrylate or methacrylic acid esters such as methyl methacrylate, ethyl methacrylate, n-butyl methacrylate, i-butyl methacrylate, t-butyl methacrylate, lauryl methacrylate, 2-ethylhexyl methacrylate, tridecyl methacrylate, stearyl methacrylate, cyclohexyl methacrylate, benzyl methacrylate, 2-hydroxyethyl methacrylate, 2-hydroxypropyl methacrylate, dimethylaminoethyl methacrylate, diethylaminoethyl methacrylate, glycidyl methacrylate, tetrahydrofurfuryl methacrylate, and allyl methacrylate may be mentioned. These may be used alone or may be used mixed in two or more types.

When the (A) component is one with a low glass transition temperature (hereinafter referred to as "Tg") as a homopolymer, the obtained cured covering becomes soft, while when it is one with a high Tg, the obtained cured covering becomes hard. Therefore, to bring out the desired properties of the cured covering, it is preferable to suitably select and use the (A) component in accordance with the Tg as a homopolymer of the (A) component. For example, a mixture of methyl methacrylate having a Tg as a homopolymer of at least 80° C. and 2-ethylhexyl acrylate having a Tg as a homopolymer of not more than 0° C. is suitably used.

In the resin composition of the present invention, the (meth)acrylic polymer used as the (B) component is one which is soluble in the (A) component. Here, "soluble" includes the case of the dispersion state. As specific examples of the (meth)acrylic polymer useful as the (B) component, a homopolymer or copolymer of monomers selected from methyl methacrylate, ethyl methacrylate, n-butyl methacrylate, i-butyl methacrylate, t-butyl methacrylate, lauryl methacrylate, 2-ethylhexyl methacrylate, methyl acrylate, ethyl acrylate, n-butyl acrylate, t-butyl acrylate, 2-ethylhexyl acrylate, etc. may be mentioned.

Among these, a homopolymer of methyl methacrylate or a copolymer of methyl methacrylate with a monomer having a low Tg as a homopolymer, for example, a copolymer with n-butyl acrylate, i-butyl acrylate, 2-ethylhexyl acrylate, n-butyl methacrylate, 2-ethylhexyl methacrylate or lauryl methacrylate is particularly preferable.

In the resin composition of the present invention, the compound including a mercapto group (—SH) and carboxyl group (—COOH) in the molecule used as the (C) component is one which exhibits superior effects in the polymerization and curing of the resin composition of the present invention, in particular, the polymerization and curing at the time of coating a thin film. The compound including a mercapto group (—SH) and carboxyl group (—COOH) in the molecule is not particularly limited, but as specific examples, an aliphatic mercaptocarboxylic acid such as 2-mercapto propionic acid, thiomalic acid, and thioglycolic acid or an aromatic mercaptocarboxylic acid such as thiosalicylic acid may be mentioned. These may be used alone or in combination of two or more types.

Among these, from the viewpoint of the ease of adjustment of the pot life of the resin composition of the present invention in the range of about 5 seconds to 40 minutes under conditions of −30 to +50° C., an aromatic mercaptocarboxylic acid, in particular thiosalicylic acid, is particularly preferable.

In the resin composition of the present invention, it is also possible to use another mercaptan compound along with the above (C) component compound. Here, the mercaptan compound means a compound having a —SH group in its molecule and is not particularly limited. As specific examples of the mercaptan compound useful in the present invention, n-octyl mercaptan, butyl mercaptan, lauryl mercaptan, dodecyl mercaptan, thioglycolic acid ester, thiophenol, benzyl mercaptan, 2-mercapto ethanol, 2-mercaptoethylamine, mercaptobenzimidazole, α-ethylhexylmercaptan, glycol dimercaptoacetate, glycol dimercaptopropionate, trimethylolpropane tristhioglycolate, trimethylolpropane tristhiopropionate, pentaerythritol tetrakis thioglycolate, pentaerythritol tetrakis thiopropionate, trishydroxyethyl isocyanulate tris(3-mercaptopropionate), 2,4,6-trimercapto-s-triazine, etc. may be mentioned.

In the resin composition of the present invention, as the organic amine able to be used as the (F) component, a primary amine, secondary amine, tertiary amine, quaternary ammonium chloride, alkanolamine, etc. may be used. For example, as an amine, preferably n-octylamine, laurylamine, dibutylamine, tributylamine, N,N-dimethyl-p-toluidine, N,N-diisopropylpyrrole p-toluidine, dimethylaniline, phenetyl dibutylamine, sulfanilic acid, N,N-diglycidyl aniline, anthranilic acid, acetoguanamine, 3-amino-1,2,4-triazole, benzoguanamine, melamine, etc. may be mentioned.

In the resin composition of the present invention, as the radial trapping agent able to be used as the (G) component, a component which controls the curing time of the composition of the present invention, in particular the pot life, is required. In the present invention, it is not particularly limited so long as it is able to trap radicals. A known one may be used, but stable nitroxy radicals are particularly preferred. As specific examples of the radical trapping agent useful as the (G) component, compounds containing nitroxide groups, e.g., 2,2,6,6-tetramethyl-1-piperidinyloxy (hereinafter referred to as "TEMPO") and its derivatives such as 4-benzoxyloxy-TEMPO, 4-methoxy-TEMPO, 4-carboxyl-4-amino-TEMPO, 4-chloro-TEMPO, 4-hydroxylimine-TEMPO, 4-hydroxy-TEMPO, 4-oxo-TEMPO, 4-amino-TEMPO, etc., 2,2,5,5-tetramethyl-1-pyrrolidinyloxy (hereinafter referred to as "PROXYL") and its derivatives such as 3-carboxyl-PROXYL, 3-carbamoyl-PROXYL, 2,2-dimethyl-4,5-cyclohexyl-PROXYL, 3-oxo-PROXYL, 3-hydroxylimine-PROXYL, 3-aminomethyl-PROXYL, 3-methoxy-PROXYL, 3-t-butyl-PROXYL, 3-maleimide-PROXYL, 3,4-di-t-butyl-PROXYL, 3-carboxylic-2,2,5,5-tetramethyl-1-pyrrolidinyloxy, etc., dialkylnitroxide radicals and their derivatives such as diphenyl nitroxide, di-t-butylnitroxide, t-butyl-t-amylnitroxide, etc., 4,4-dimethyl-1-oxazolidinyloxy (hereinafter referred to as "DOXYL") and its derivatives such as 2-di-t-butyl-DOXYL, 5-decane-DOXYL, 2-cyclohexenae-DOXYL, etc. and mixtures thereof may be mentioned.

In the resin composition (I) of the present invention, the proportion of the (A) component and the (B) component is, from the viewpoint of work efficiency in coating the resin composition, in the range of 40 to 90 parts by mass of the (A) component and in the range of 10 to 60 parts by mass of the (B) component based on 100 parts by mass of the acrylic resin syrup comprised of the (A) component and the (B) component, preferably in the range of 45 to 80 parts by mass of the (A) component and in the range of 20 to 55 parts by mass of the (B) component. If the proportion of the (A) component is less than 40 parts by mass, the curing time is shortened, but the speed of rise in viscosity of the composition becomes faster, so the pot life becomes shorter and the working efficiency in application tends to fall, while if the proportion of the (A) component is over 90 parts by mass, the speed of rise of the viscosity of the composition becomes lower, so the pot life becomes longer and the work efficiency in application is improved, but the polymerization and curing property tends to become lower. Further, if the proportion of the (B) component becomes less than 10 parts by mass, the viscosity of the composition fails and the work efficiency in coating is improved, but the polymerization and curing property tends to fall, while if the proportion becomes more than 60 parts by mass, the curing time is shortened, but the viscosity of the composition rises and the work efficiency in coating tends to fall. Further, the proportion of the (C) component is in the range of 0.05 to 10 parts by mass, preferably in the range of 0.1 to 5 parts by mass, based on 100 parts by mass of the acrylic resin syrup comprised of the (A) component and the (B) component. If the proportion of the (C) component is less than 0.05 part by mass, the speed of polymerization and curing of the resin composition tends to become slower, while if the proportion becomes more than 10 parts by mass, the speed of polymerization and curing becomes faster and almost no pot life tends to be obtained any longer. Further, the initial yellowing of the cured covering obtained and the yellowing after aging tend to increase.

In the resin composition (II) of the present invention, the proportion of the (A) component and the (B) component, from the viewpoint of the work efficiency in coating the resin composition, is preferably in the range of 40 to 90 parts by mass of the (A) component and in the range of 10 to 60 parts by mass of the (B) component based on 100 parts by mass of the acrylic resin syrup comprised of the (A) component and the (B) component, more preferably in the range of 45 to 80 parts by mass of the (A) component and 20 to 55 parts by mass of the (B) component. If the proportion of the (A) component is less than 40 parts by mass, the viscosity of the composition rises and the work efficiency in application tends to fall, while if the proportion is over 90 by weight, the viscosity of the composition falls and work efficiency in coating is improved, but the polymerization and curing property tends to fall. Further, if the proportion of the (B) component is less than 10 parts by mass, the viscosity of the composition falls and the work efficiency in coating is improved, but the polymerization and curing property tends to fall, while if the proportion is over 60 parts by mass, the curing time is shortened, but the viscosity of the composition rises and the work efficiency in coating tends to fall. Further, the proportion of the (C) component is preferably in the range of 0.05 to 15 parts by mass based on 100 parts by mass of the acrylic resin syrup comprised of the (A) component and the (B) component, more preferably in the range of 0.1 to 10 parts by mass. If the proportion of the (C) component is less than 0.05 parts by mass, the polymerization and curing property tends to fall, while even if the proportion is over 15 parts by mass, there is almost no effect on the polymerization and curing time and, in some cases, the polymerization and curing time conversely tends to become longer. Further, the proportion of the organic amine of the (F) component is preferably in the range of 0.001 to 10 parts by mass based on 100 parts by mass of the total of the (A) component and the (B) component, more preferably in the range of 0.005 to 5 parts by mass. If the proportion of the organic amine is less than 0.001 part by mass, the polymerization and curing property tends to fall, while even if the proportion is over 10 parts by mass, there tends to be almost no effect on the polymerization and curing time any longer.

In the resin composition (III) of the present invention, the proportion of the (A) component and the (B) component is, from the viewpoint of the work efficiency in coating the resin composition, preferably in the range of 40 to 90 parts by mass of the (A) component and in the range of 10 to 60 parts by mass of the (B) component based on 100 parts by mass of the acrylic resin syrup comprised of the (A) component and the (B) component, more preferably in the range of 45 to 80 parts by mass of the (A) component and in the range of 20 to 55 parts by mass of the (B) component. If the proportion of the (A) component is less than 40 parts by mass, the viscosity of the composition rises and the work efficiency in application tends to fall, while if the proportion is over 90 parts by mass, the viscosity of the composition falls and the work efficiency in coating is improved, but the polymerization and curing property tends to fall. Further, if the proportion of the (B) component is less than 10 parts by mass, the viscosity of the composition falls and the work efficiency in coating is improved, but the polymerization and curing property tends to fall, while if the proportion is over 60 parts by mass, the curing time is shortened, but the viscosity of the composition rises and the work efficiency of coating tends to fall. Further, the proportion of the (F) component is preferably in the range of 0.001 to 10 parts by mass based on 100 parts by mass of the total of the (A) component and the (B) component, more preferably in the range of 0.005 to 5 parts by mass. If the proportion of the organic amine of the (F) component is less than 0.001 part by mass, the polymerization and curing property in the low temperature region tends to fall, while even if the proportion is over 10 parts by mass, there tends to be less of an effect on the polymerization and curing time. Further, the proportion of the (G) component is preferably in the range of 0.001 to 3 parts by mass based on 100 parts by mass of the total of the (A) component and the (B) component, more preferably in the range of 0.005 to 1.5 parts by mass. If the proportion of this component is less than 0.001 part by mass, a sufficient pot life cannot be obtained and the application time tends to become insufficient. Further, if over 3 parts by weight, a sufficient curing ability of the composition tends to no longer be obtained.

In the resin compositions (I) to (III) of the present invention, when using another mercaptan compound such as mentioned above along with the (C) component compound, that mercaptan compound is preferably used in the range of not more than 99.9 parts by mass based on 100 parts by mass of the total of the compound and the (C) component compound.

The resin compositions (I) to (III) of the present invention may further include, as desired, the peroxide (D). As the peroxide (D), a peroxy ester such as t-butyl peroxymaleic acid, t-amyl peroxymaleic acid, t-butyl peroxysuccinic acid, and t-amyl succinic acid may be suitably used.

The preferable proportion of the peroxide (D) is preferably in the range of 0.01 to 15 parts by mass based on 100 parts by mass of the total of the (A) component and the (B) component, more preferably in the range of 0.1 to 10 parts by mass. If the proportion of the peroxide (D) is over 15 parts by mass, the molecular weight of the cured covering falls and the strength tends to fall. Regarding the pot life as well, in the case of the resin compositions (I) to (III), the pot life tends to become shorter, while in the case of the resin composition (II), the pot life ends up changing or becoming longer. If the proportion is less than 0.01 part by mass, a sufficient curing ability of the composition tends to no longer be obtained.

The resin compositions (I) and (II) of the present invention may also contain, if desired, an organometallic complex (E). Here, the organo metallic complex is not particularly limited so long as it is comprised of a complex formed by a metal and an organic compound. For example, a metal complex compound of aluminum and acetylacetone may be mentioned. As an organic compound able to form a complex with aluminum, in addition, for example, phenylacetylacetone, 2,2,6,6-tetramethyl-3,5-heptadione etc. may be mentioned.

The preferable ratio of use of this organometallic complex (E) is preferably in the range of 0.01 to 10 parts by mass with respect to 100 parts by mass of the total of the (A) component and the (B) component, more preferably in the range of 0.1 part by weight to 5 parts by weight.

If desired, the resin composition (III) of the present invention may further include a sulfur compound (H). The sulfur compound able to be used as the (H) component is not particularly limited, but a mercaptan, sulfinic acid ester, thiourea, etc. may be suitably used. For example, n-octylmercaptan, laurylmercaptan, dodecylmercaptan, butylmercaptan, thioglycolic acid, 2-ethylhexyl thioglycolate, 2-mercaptoethanol, α-ethylhexylmercaptan, glycol dimercaptoacetate, glycol dimercaptopropionate, trimethylolpropane tristhioglycolate, trimethylolpropane tristhiopropionate, pentaerythritol tetrakis thioglycolate, pentaerythritol tetrakis thiopropionate, trishydroxyethyl isocyanulate and mercaptan compounds, 2,4,6-trimercapto-s-triazine, 2-mercaptopropionic acid, thiomalic acid, thioglycolic acid, thiosalicylic acid, methyl p-toluene sulfinate, ethyl p-toluene sulfinate, tetramethyl thiourea, dibutyl thiourea, etc. may be mentioned. These may be used alone or in combinations of two or more types.

The proportion of the (H) component is preferably in the range of 0.05 to 15 parts by mass based on 100 parts by mass of the total of the (A) component and the (B) component, more preferably in the range of 0.1 to 10 parts by mass. If the proportion of the (H) component is less than 0.05 part by weight, the polymerization and curing property tends to fall, while even if the proportion is over 15 parts by weight, there is almost no effect on the polymerization and curing time and in some cases the polymerization and curing time conversely tends to become slower.

If desired, the resin composition (III) of the present invention nay also have added to it a metal compound as the (I) component. The metal compound able to be used as the (I) component is not particularly limited, but a compound of a metal selected from the metals of the Group IA and Group IIA of the Periodic Table and zinc, lead, cobalt, nickel, manganese, iron, and copper or an organometallic complex of these metals with an organic compound may be suitably used. For example, an oxide or hydroxide of a metal, a carbonate of sodium, potassium, or zinc, an acetate of sodium, potassium, copper, strontium, magnesium, lead, cobalt, or manganese, an acidic phthalate, bicarbonate, benzoate, or phosphate of sodium or potassium, a metal complex with an organic compound selected from acetylacetone, phenylacetylacetone, and 2,2,6,6-tetramethyl-3,5-heptadione may be mentioned.

The proportion of the (I) component is preferably in the range of 0.01 to 10 parts by mass based on 100 parts by mass of the total of the (A) component and the (B) component, more preferably in the range of 0.05 to 5 parts by weight. Even if the proportion of the metal compound is over 10 parts by weight or even if less than 0.01 part by weight, there tends to be less of an effect in improving the curing ability of the composition.

The resin composition (III) of the present invention may have further added to it water in accordance with need when using a metal salt. Water functions as a solvent of the metal salt and adjusts the reactivity and the reaction speed. The water may be used in an amount within a range not inhibiting polymerization. The amount is preferably in the range of 0.05 to 5 parts by mass based on 100 parts by mass of the total of the (A) component and the (B) component, more preferably in the range of 0.1 to 3 parts by mass. If the amount of use of water is over 5 parts by mass, the curing ability of the composition tends to fall.

The resin compositions (I) to (III) of the present invention may, as desired, have further added to them a plasticizer (J) soluble in the (meth)acrylic acid ester (A) for the purpose of adjusting the viscosity of the resin phase or improving the followability of the cured covering to the road surface by plasticity. As specific examples of the plasticizer (J), phthalic acid esters such as dibutyl phthalate, di-n-octyl phthalate, di-2-ethylhexyl phthalate, octyldecyl phthalate, di-n-decyl phthalate, diisodecyl phthalate and butyl benzyl phthalate, di-2-ethylhexyl adipate, octyldidecyl adipate, di-2-ethylhexyl sebacate, dibutyl sebacate, di-2-ethylhexyl sebacate, polypropylene glycol, chlorinated paraffin, adipic acid-based, azelaic acid-based, sebacic acid-based and phthalic acid-based polyester-based plasticizers, epoxy-based polymer plasticizers such as epoxylated oils and epoxylated fatty acid esters, etc. may be mentioned. These may be used alone or in combinations of two or more types.

The preferable proportion of the plasticizer (J) is in the range of 0.1 to 25 parts by mass based on 100 parts by mass of the total of the (A) component and the (B) component, more preferably in the range of 0.5 to 20 parts by weight.

The resin compositions (I) to (III) of the present invention may, in accordance with need, have further added to them a compound (K) having at least two polymerizing function groups in its molecule for the purpose of improving the durability of the cured covering. As specific examples of such a compound (K), alkanediol di(meth)acrylates such as ethyleneglycol di(meth)acrylate, 1,2-propyleneglycol di(meth)acrylate, 1,3-butyleneglycol di(meth)acrylate and 1,6-hexanediol di(meth)acrylate, polyoxyalkyleneglycol di(meth)acrylates such as diethyleneglycol di(meth)acrylate, dipropyleneglycol di(meth)acrylate, triethyleneglycol di(meth)acrylate, tetraethyleneglycol di(meth)acrylate and polyethyleneglycol di(meth)acrylate, divinylbenzene, etc. may be mentioned. These may be used alone or in mixtures of two or more types.

The resin compositions (I) to (III) of the present invention may, in accordance with need, have further added to them a paraffin wax and/or wax (L) for the purpose of suppressing the effect of oxygen in inhibiting polymerization at the surface of the coating and improving the resistance to staining. The paraffin and/or wax is not particularly limited, but for example paraffin wax, polyethylene wax, a higher fatty acid such as stearic acid, etc. may be mentioned. It is also possible to use a combination of two or more types with different melting points.

The amount used of the paraffin and/or wax is not particularly limited, but preferably is in the range of 0.1 to 5 parts by mass based on 100 parts by mass of the total of the (A) component and the (B) component, more preferably in the range of 0.2 to 2 parts by mass. If the amount used of the paraffin and/or wax is over 5 parts by weight, the appearance of the coating surface tends to be impaired.

The resin compositions (I) to (III) of the present invention may further have added to them a UV absorber (M) for further improving the weathering resistance. As such a UV absorber, a benzophenon-based UV absorber, triazine-based UV absorber, benzotriazole-based UV absorber, etc. may be mentioned. Specifically, for example, derivatives of 2-hydroxybenzophenone such as 2-hydroxy-4-methoxybenzophenone, 2-hydroxy-4-octyloxy benzophenone, 2-hydroxy-4-decyloxybenzophenone, 2-hydroxy-4-dodecyloxybenzophenone, 2-hydroxy-4,4'-dimethoxybenzophenone and 2-hydroxy -4,4'-dibutoxybenzophenone, benzotriazole derivatives such as 2-(2'-hydroxy-5'-methylphenylyl)benzotriazole, 2-(2'-hydroxy-3,5'-di-t-butylphenylyl)benzotriazole and 2-[2'-hydroxy-3,5'-bis(2,2'-dimethylpropyl)phenyl]benzotriazole, or halogen-substituted derivatives of the same, esters of salicylic acid such as phenyl salicylate, p-ethylphenyl salicylate, and p-t-butylphenyl salicylate, etc. may be mentioned.

The UV absorber (M) may preferably be added in a range of 0.01 to 10 parts by mass based on 100 parts by mass of the total of the (A) component and the (B) component, more particularly in the range of 0.01 to 5 parts by weight.

The method of polymerization of the resin composition of the present invention is not particularly limited, but for example the polymerization may be performed by bulk polymerization using a mold. At that time, it is possible to prepare the resin composition in advance and cast it in the mold for polymerization.

To efficiently apply the resin composition of the present invention, for example, the method is preferably used of for example mixing the (A) component and the (B) component in advance, dividing the mixture into two, adding the peroxide (D) to dissolve in one part and adding the (C) component to dissolve in the other part, and mixing the two liquids for polymerization immediately before application.

At the time of application, when using the resin composition of the present invention in the field of civil engineering and construction such as for covering concrete, asphalt, steel plate, and other floor or wall surfaces, it is possible to further add a silane coupling agent such as γ-methacryloxypropyl trimethoxysilane, γ-glycidoxypropyl trimethoxysilane, N-β-(aminoethyl)-γ-aminopropyl trimethoxysilane, or γ-mercaptopropyl trimethoxysilane for the purpose of stabilizing the bonding with a substrate or improving the durability of the bond strength with the filter.

Further, it is possible to add a phosphate such as tributyl phosphate, tri(2-ethylhexyl) phosphate, tridecyl phosphate, tristearyl phosphate, tris(nonylphenyl)phosphate, or triphenyl phosphate for the purpose of stabilizing the curing of the composition of the present invention, possible to add various types of defoaming agents and leveling agents for the purpose of achieving a uniform surface appearance of the cured coating, and possible to add a polymerization inhibitor such as hydroquinone, hydroquinone monomethyl ether, or 2,4-dimethyl-t-butylphenol for the purpose of improving the storage stability of the composition of the present invention.

Note that when the resin composition of the present invention is used for civil engineering and construction applications, it is suitably provided for coating as a mixture with an aggregate or other filler suitably selected and mixed in a necessary amount in accordance with the objective of use. As the aggregate, one having a mean particle size of at least 10 μm and having an oil absorption with respect to 100 g of linseed oil of not more than 25 cc is suitably used. As specific examples of such an aggregate, sand, silica sand, quartz sand, and colored or calcined products of the same, stone power such as quartz power, or silica sand power, pulverized colored ceramic or ceramic material calcined and hardened, zinc white, calcium carbonate, alumina, glass beads, etc. may be mentioned. From the viewpoint of improving the work efficiency in coating and the self-leveling ability, a combination of aggregates with different particle sizes is preferable.

Further, it is also possible to add a silica powder such as Aerosil as the filler for imparting thixotropy to the mixture. As the filler, it is possible to additionally use a coloring pigment or dye. As specific examples, titanium oxide, barium sulfate, carbon black, chrome vermillion, bengara, ultramarine, cobalt blue, phthalocyanine blue, phthalocyanine green, etc. may be mentioned. The amount of these fillers added is not particularly limited, but in general if added in a range of up to 900 parts by mass based on 100 parts by mass of the resin composition of the present invention, a coating with a good balance of various physical properties tends to be obtained.

The mixture of the resin composition of the present invention with the various additives and aggregate and other fillers may be used for covering a concrete, asphalt, steel plate, or other floor or wall surface etc. At the time of application, in accordance with need, it is preferable to prime the substrate such as the floor, wall, etc. and coat the mixture over the same.

As the method of application, the method of spraying, troweling, brushing, roller coating, etc. may be used. By coating a mixture not including the aggregate or including only part of it and then spreading the aggregate before curing, it is possible to have part of the aggregate stick out from the coating surface and therefore give a nonslip property. In a mixture into which the aggregate is mixed in advance, the type and amount of the aggregate is selected in accordance with the purpose of the coating.

By using methods of application such as spraying, brushing, and roller coating, it is possible to apply a relatively thin coating, for example, a coating of 0.2 to 1 mm. In the case of such an objective, the amount of the aggregate is preferably in the range of 30 to 100 parts by mass based on 100 parts by mass of the resin composition of the present invention.

When applying a thicker coating, for example, a coating of 1 to 30 mm, troweling is preferable. The amount of the aggregate is preferably in the range of 100 to 900 parts by mass based on 100 parts by mass of the resin composition of the present invention. In this case, when desiring a smooth coating surface, it is preferable to reduce the amount of the aggregate to about 100 parts by mass. When not desiring to increase the thickness of the coating, it is preferable to increase the amount of the aggregate to about 900 parts by mass from the viewpoint of economicalness. Use of aggregate in an amount of over 900 parts by mass, however, is not preferable since it reduces the curing ability of the mixture.

Further, it is possible to make the resin composition of the present invention a two-pack type (main agent and curing agent) in accordance with the method of application.

In the resin compositions (I) and (III) of the present invention, by combing compounds, it is possible to give a working life of about 5 to 40 minutes and cure in 1 to 2 hours in a temperature range of −30 to +50° C. and, further, possible to obtain a cured covering having low yellowing and superior in weathering resistance.

On the other hand, in the resin composition (II) of the present invention, by combing compounds, it is possible to cause quick curing within 10 minutes, preferably within 5 minutes, particularly preferably within 3 minutes, in a temperature range of −30 to +50° C. The composition exhibits a quick curing ability even at room temperature or in a high temperature region of about 100° C.

In this way, the resin composition of the present invention has a broad temperature range of use and a superior quick curing ability, so can be broadly used for civil engineering and construction applications. Further, the curing time can also be controlled over a considerable range. In particular, these compositions are suitably used as covering materials for civil engineering and construction applications where a quick curing ability is sought such as for coating and covering a concrete, asphalt, or other road surface or floor or wall surface, for marking etc. Specifically, it is useful for a method of application such as casting, coating, thin mortar coating, thick mortar coating, and the method of spraying and mixing two or more packs immediately before application, and curing it.

Next, the present invention will be explained in further detail with reference to examples and comparative examples, but the present invention is not limited to these examples in any way. Note that the "parts" in the examples indicate parts by mass.

In the examples, the "pot life" means the time (minutes) from when starting to stir the acrylic-based resin syrup composition by a stirring rod to which stirring becomes impossible due to the rise in viscosity, while the "curing time" means the time (minutes) until the surface of the cured covering of the acrylic-based resin syrup composition becomes completely tack free. Note that "tack free" spoke of here means the state where after gauze is placed on the surface of the cured covering and a load of 500 g is applied for 1 minute, the gauze will slide off when the cured covering is tilted 30 degrees with respect to the horizontal direction.

The following properties were evaluated by the following methods:

Yellow Index (YI)

This was measured in accordance with JIS K-7103using a color difference meter analyzer (Model 307 made by Hitachi Ltd.) Note that the YI is calculated by the following equation using the X, Y, and Z excitation values:

$$YI=100(1.24X-1.06Z)/Y$$

Weathering Resistance

Samples were exposed for 100 hours and 500 hours to a black panel temperature of 63° C. and a cycle of 12 minutes water/60 minutes drying using a Sunshine Weather-O-meter (WE-SN-DC made by Suga Shikenki) to evaluate the Yellow Index (YI).

EXAMPLE 1

| A mixture comprised of | |
|---|---|
| Methyl methacrylate | 70 parts |
| 2-ethylhexyl acrylate | 5 parts |
| Triethyleneglycol dimethacrylate | 5 parts |
| Dioctyl terephthalate | 1.5 parts |
| Paraffin wax (melting point 47° C.) | 0.25 part |
| Paraffin wax (melting point 66° C.) | 0.25 part | was warmed to 50° C. while stirring, 25 parts of polymethyl methacrylate were added a little at a time and made to dissolve, then the mixture was cooled to room temperature to obtain an acrylic-based resin syrup. Next, under conditions of 20° C. 0.5 parts of Tinuvin 328 (UV absorber, made by Ciba-Geigy), 0.2 part of thiosalicylic acid, and 0.5 part of an aluminum complex of acetylacetone were added to this and stirred for mixing.

Next, 0.6 part of t-butylperoxymaleic acid (hereinafter called "PMA") was added and stirred to prepare an acrylic resin, syrup composition. This was quickly coated on a polyethylene terephthalate (hereinafter called "PET") film at 20° C. by the troweling method to give a thickness of about 3 mm. As a result, a pot life of about 10 minutes was obtained after the addition of the PMA and complete curing took place in about 30 minutes.

The YI of the obtained cured covering was 4.3.

Further, the YI after the weathering resistance test was 11.6 after 100 hours and 15.9 after 500 hours.

EXAMPLES 2 to 13

Except for changing the composition of the acrylic resin syrup composition and the composition of the polymerization initiator to those shown in Table 1, the same procedure as in Example 1 was repeated to obtain a cured covering and measure the pot life, curing time, and the YI at the initial state and after a weathering resistance test.

The results of the evaluation are shown together with the results for Example 1 in Table 1.

Comparative Example 1

| A mixture comprised of | |
|---|---|
| Methyl methacrylate | 70 parts |
| 2-ethylhexyl acrylate | 5 parts |
| Triethyleneglycol dimethacrylate | 5 parts |
| Dioctyl terephthalate | 1.5 parts |

-continued

| A mixture comprised of | |
|---|---|
| Paraffin wax (melting point 47° C.) | 0.25 part |
| Paraffin wax (melting point 66° C.) | 0.25 part | was warmed to 50° C. while stirring, 25 parts of polymethyl methacrylate were added a little at a time and made to dissolve, then the mixture was cooled to room temperature to obtain an acrylic resin syrup. Next, 0.2 part of benzoic acid was added and stirred for mixture.

Next, 0.6 part of PMA was added and stirred to prepare an acrylic resin syrup composition. This was quickly coated on a PET film at 20° C. by the troweling method to give a thickness of about 3 mm. As a result, there was no complete polymerization and curing even after the elapse of about 2 hours after the addition of the PMA.

Comparative Examples 2 to 4

Except for changing the composition of the acrylic resin syrup composition and the composition of the polymerization initiator to those shown in Table, 1, the same procedure as in Example 1 was repeated to obtain a cured covering and measure the pot life, curing time, and the YI at the initial state and after a weathering resistance test.

The results of the evaluation are shown in Table 1.

EXAMPLE 14

Except for casting the composition prepared in Example 1 into a mold of 150×150×3 mm size and causing polymerization at 40° C., the same procedure as in Example 1 was repeated to obtain a cured covering and measure the pot life, curing time, and the YI at the initial state and after a weathering resistance test.

The results of the evaluation are shown in Table 1.

EXAMPLE 15

Except for coating the PET film to a thickness of 0.5 mm, the same procedure as in Example 1 was repeated to obtain a cured covering and measure the pot life, curing time, and the YI at the initial state and after a weathering resistance test.

The results of the evaluation are shown in Table 1.

EXAMPLE 16

Except for making the temperature at the time of mixing the components of the resin composition and the temperature at the time of coating the resin composition 40° C., the same procedure as in Example 1 was repeated to obtain a cured covering and measure the pot life, curing time, and the YI at the initial state and after a weathering resistance test.

The results of the evaluation are shown in Table 1.

EXAMPLE 17

Except for making the temperature at the time of mixing the components of the resin composition and the temperature at the time of coating the resin composition −20° C., the same procedure as in Example 1 was repeated to obtain a cured covering and measure the pot life, curing time, and the YI at the initial state and after a weathering resistance test.

The results of the evaluation are shown in Table 1.

TABLE 1

| | Resin composition (parts by weight) | | | | | | | | Polymerization behavior | | | | |
|---|---|---|---|---|---|---|---|---|---|---|---|---|---|
| | (A) comp. mono-functional monomer | (B) comp. polymer | (C) component mercaptan | (D) comp. peroxide | (E) comp. organo-metallic compound *1) | (K) comp. multi-functional monomer | (M) UV absorber | Temp. (° C.) | Pot life (min) | Curing time (min) | 0 hr | YI 100 hr | 500 hr |
| Ex. 1 | MMA 70 EHA 5 | PM 25 | Thiosalicylic acid 0.2 | PMA 0.6 | 0.5 | 3G 5 | T-328 0.5 | 20 | 15 | 30 | 4.3 | 11.6 | 15.9 |
| Ex. 2 | MMA 70 EHA 5 | OM 25 | Thiosalicylic acid 0.2 | PMA 1.0 | 0.5 | 3G 5 | 0 | 20 | 15 | 30 | 4.4 | 40.0 | 68.0 |
| Ex. 3 | MMA 70 EHA 5 | PM 25 | Thiosalicylic acid 0.2 | PMA 0.6 | 0.2 | 3G 5 | 0 | 20 | 18 | 30 | 4.3 | 34.2 | 60.6 |
| Ex. 4 | MMA 70 EHA 5 | PM 25 | Thiosalicylic acid 0.2 | PMA 0.6 | 0.5 | 3G 5 | 0 | 20 | 15 | 30 | 4.4 | 34.0 | 61.0 |
| Ex. 5 | MMA 60 EHA 5 | PM 25 | Thiosalicylic acid 0.2 | PMA 0.6 | 0.5 | 3G 5 | T-328 0.5 | 20 | 12 | 30 | 4.5 | 11.9 | 16.6 |
| Ex. 6 | MMA 75 | PM 25 | Thiosalicylic acid 0.2 | PMA 0.6 | 0.5 | 9PG 5 | T-328 0.5 | 20 | 15 | 30 | 4.7 | 12.6 | 16.9 |
| Ex. 7 | MMA 70 EHA 5 | PM 30 | Thiosalicylic acid 0.2 | PMA 0.6 | 0.5 | 3G 5 | T-328 0.5 | 20 | 13 | 30 | 4.2 | 11.3 | 15.5 |
| Ex. 8 | MMA 70 EHA 5 | PM 25 | Thiosalicylic acid 0.2 | PMA 0.6 | 2.0 | 3G 5 | T-P 0.5 | 20 | 10 | 25 | 4.9 | 14.3 | 18.0 |
| Ex. 9 | MMA 70 EHA 5 | PM 25 | Thiosalicylic acid 0.2 | PMA 5.0 | 0.5 | 3G 5 | T-328 1.0 | 20 | 8 | 20 | 4.6 | 10.5 | 14.5 |
| Ex. 10 | MMA 70 EHA 5 | PM 25 | Thiosalicylic acid 5.0 | PMA 0.6 | 0.5 | 3G 5 | T-328 1.0 | 20 | 8 | 20 | 5.5 | 14.0 | 20.0 |
| Ex. 11 | MMA 70 EHA 5 | PM 25 | Thiosalicylic acid 0.2 | PMA 0.6 | 0.5 | 3G 5 | T-328 5.0 | 20 | 17 | 35 | 5.1 | 10.1 | 13.5 |
| Ex. 12 | MMA 70 EHA 5 | PM 25 | Thiosalicylic acid 0.2 | PMA 0.6 | 0.5 | 3G 5 | T-P 5.0 | 20 | 17 | 35 | 5.4 | 10.9 | 14.0 |

TABLE 1-continued

| | Resin composition (parts by weight) | | | | | | | | Polymerization behavior | | | | |
|---|---|---|---|---|---|---|---|---|---|---|---|---|---|
| | (A) comp. mono-functional monomer | (B) comp. polymer | (C) component mercaptan | (D) comp. peroxide | (E) comp. organo-metallic compound *1) | (K) comp. multi-functional monomer | (M) UV absorber | Temp. (° C.) | Pot life (min) | Curing time (min) | YI 0 hr | YI 100 hr | YI 500 hr |
| Ex. 13 | MMA 70 EHA 5 | PM 25 | Thiosalicylic acid 0.2 | PMA 0.6 | 0 | 3G 5 | T-328 0.5 | 20 | 17 | 35 | 4.1 | 10.0 | 13.8 |
| Ex. 14 | MMA 70 EHA 5 | PM 25 | Thiosalicylic acid 0.2 | PMA 0.6 | 0.2 | 3G 5 | T-328 0.5 | 40 | 8 | 23 | 4.2 | 11.0 | 14.9 |
| Ex. 15 | MMA 70 EHA 5 | PM 25 | Thiosalicylic acid 0.2 | PMA 0.6 | 0.5 | 3G 5 | T-328 0.5 | 20 | 10 | 30 | 4.5 | 9.8 | 13.2 |
| Ex. 16 | MMA 70 EHA 5 | PM 25 | Thiosalicylic acid 0.2 | PMA 0.6 | 0.5 | 3G 5 | T-328 0.5 | 40 | 9 | 25 | 4.2 | 10.2 | 13.8 |
| Ex. 17 | MMA 70 EHA 5 | PM 25 | Thiosalicylic acid 0.2 | PMA 0.6 | 0.5 | 3G 5 | T-328 0.5 | −20 | 25 | 60 | 4.3 | 11.4 | 16.4 |
| Comp. Ex. 1 | MMA 70 EHA 5 | PM 25 | Benzoic acid 0.2 | PMA 0.6 | 0 | 3G 5 | 0 | 20 | No gelation | No curing | Not meas. | Not meas. | Not meas. |
| Comp. Ex. 2 | MMA 70 EHA 5 | PM 25 | 0 | PMA 0.6 | 0 | 3G 5 | 0 | 20 | No gelation | No curing | Not meas. | Not meas. | Not meas. |
| Comp. Ex. 3 | MMA 70 EHA 5 | PM 25 | Thiosalicylic acid 11 | PMA 0.6 | 0.5 | 3G 5 | 0 | 20 | 1 | 5 | 7.0 | 50.2 | 82.6 |
| Comp. Ex. 4 | MMA 70 EHA 5 | PM 25 | Thiosalicylic acid 11 | PMA 0.6 | 0.5 | 3G 5 | 0 | 20 | 1 | 5 | 7.0 | 20.5 | 35.6 |

Note that the abbreviations used in Table 1 mean the following:
MMA: Methyl methacrylate
EHA: 2-ethylhexylacrylate
PM: Polymethyl methacrylate
3G: Triethylene glycol dimethacrylate
9PG: Polypropyleneglycol dimethacrylate
PMA: t-butylperoxymaleic acid
PSA: t-butylperoxysuccinic acid
T-328: Tinuvin 328 (made by Ciba-Geigy, UV absorber)
T-P: Tinuvin P (made by Ciba-Geigy, UV absorber)

In Comparative Example 1, since benzoic acid was used instead of the component (C), gelation did not occur and therefore the pot life could not be measured. Further, the material did not cure completely and therefore the YI could not be measured.

In Comparative Example 2, since the component (C) was not used, gelation did not occur and therefore the pot life could not be measured. Further, the material did not cure completely and therefore the YI could not be measured.

In Comparative Example 3, the amount of the component (C) used was large, so the polymerization and curing were quick and the pot life and the curing time were a short 1 minute and 5 minutes, respectively. Further, the cured covering obtained had a high YI of 7.0.

EXAMPLE 18

A mixture comprised of

| | |
|---|---|
| Methyl methacrylate | 70 parts |
| 2-ethylhexyl acrylate | 5 parts |
| Triethyleneglycol dimethacrylate | 5 parts |
| Dioctyl terephthalate | 1.5 parts |
| Paraffin wax (melting point 47° C.) | 0.25 part |
| Paraffin wax (melting point 66° C.) | 0.25 part | was warmed to 50° C. while stirring, 25 parts of polymethyl methacrylate were added a little at a time and made to dissolve, then the mixture was cooled to room temperature to obtain an acrylic resin syrup. Next, under conditions of 20° C., 1.0 parts of thiosalicylic acid and 0.2 part of n-octylamine were added to this and stirred for mixing.

Next, 0.9 part of t-butylperoxymaleic acid (hereinafter called "PMA") was added to prepare an acrylic resin syrup composition. This was stirred, then quickly coated on a polyethylene terephthalate (hereinafter called "PET") film at 20° C. to give a thickness of about 3 mm. As a result, the composition cured in about 3 minutes after the addition of the PMA.

The YI of the obtained cured covering was 2.9. The YI after the weathering resistance test was 5.9 after 100 hours and 7.0 after 500 hours.

EXAMPLES 19 to 31

Except for changing the composition of the acrylic resin syrup composition and the composition of the polymerization initiator to those shown in Table 2, the same procedure as in Example 18 was repeated to obtain a cured covering and measure the YI, pot life, and curing time.

The results are shown together with the results for Example 18 in Table 2.

Comparative Example 5

A mixture comprised of

| | |
|---|---|
| Methyl methacrylate | 70 parts |
| 2-ethylhexyl acrylate | 5 parts |
| Triethyleneglycol dimethacrylate | 5 parts |
| Dioctyl terephthalate | 1.5 parts |
| Paraffin wax (melting point 47° C.) | 0.25 part |
| Paraffin wax (melting point 66° C.) | 0.25 part | was warmed to 50° C. while stirring, 25 parts of polymethyl methacrylate were added a little at a time and made to dissolve, then the mixture was cooled to room temperature to obtain an acrylic resin syrup. Next, under conditions of −20° C., 1.0 part of thiosalicylic acid was added and stirred for mixture.

Next, 0.9 part of PMA was added to prepare an acrylic resin syrup composition. This was stirred, then quickly coated on a PET film at −20 C. to give a thickness of about 3 mm. As a result, while gelation was seen after the elapse of about 60 minutes after the addition of the PMA, complete curing did not occur.

Comparative Example 6

Except for changing the composition of the polymerization initiator as shown in Table 2, the same procedure as in Example 18 was repeated to measure the YI, pot life, and curing time.

The results are shown in Table 2.

EXAMPLE 32

Except for casting the composition prepared in Example 18 into a mold of 150×150×3 mm size and causing polymerization at 90° C., the same procedure as in Example 18 was repeated. As a result, the curing time was 3 minutes and the YI was 2.7. Further, the YI after a weather resistance test of the cured covering was 5.8 after 100 hours and 6.8 after 500 hours.

EXAMPLE 33

Except for coating the PET film to a thickness of 0.5 mm, the same procedure as in Example 18 was repeated. As a result, the curing time was about 4 minutes and the YI was 2.5 Further, the YI after a weathering resistance test of the cured covering was 5.2 after 100 hours and 6.4 after 500 hours.

TABLE 2

| | Resin composition (parts by weight) | | | | | | | Polymerization behavior | | | | |
|---|---|---|---|---|---|---|---|---|---|---|---|---|
| | (A) comp. mono-functional monomer | (B) comp. polymer | (C) comp. sulfur compound | (F) comp. organic amine | (D) comp. peroxide | (E) comp. organo-metallic compound | (M) UV absorber | Temp. (° C.) | Pot life (min) | Curing timer (min) | YI 0 hr | YI 100 hr | YI 500 hr |
| Ex. 18 | MMA 70 EHA 5 | PM 25 | Thiosalicylic acid 1.0 | n-octyl-amine 0.2 | PMA 0.9 | 0 | T-328 0.5 | 20 | 0.5 | 3 | 2.9 | 5.9 | 7.0 |
| Ex. 19 | MMA 70 EHA 5 | PM 25 | Thiosalicylic acid 1.0 | n-octyl-amine 0.2 | PMA 0.9 | 0 | T-328 0.5 | 20 | 0.5 | 3 | 3.1 | 5.4 | 6.5 |
| Ex. 20 | MMA 70 EHA 5 | PM 25 | Thiosalicylic acid 0.5 | n-octyl-amine 0.2 | PMA 0.9 | 0 | T-328 0.5 | 20 | 0.5 | 3 | 2.7 | 5.4 | 6.5 |
| Ex. 21 | MMA 70 EHA 5 | PM 25 | Thiosalicylic acid 1.0 | n-octyl-amine 0.2 | PMA 0.9 | 0 | T-328 0.5 | −20 | 3.5 | 9 | 2.9 | 6.0 | 7.0 |
| Ex. 22 | MMA 70 EHA 5 | PM 25 | Thiosalicylic acid 1.0 | n-octyl-amine 0.2 | PMA 0.9 | 0 | T-P 0.5 | 20 | 0.5 | 3 | 2.5 | 6.0 | 7.3 |
| Ex. 23 | MMA 70 EHA 5 | PM 25 | Thiosalicylic acid 1.0 | Aceto-guan-amine 0.2 | PMA 0.9 | 0 | T-328 0.5 | 20 | 0.2 | 2 | 2.0 | 6.3 | 7.2 |
| Ex. 24 | MMA 60 EHA 5 | PM 35 | Thiosalicylic acid 1.0 | n-octyl-amine 0.05 | PMA 0.9 | 0 | T-P 0.5 | 20 | 0.5 | 3 | 2.4 | 5.8 | 7.0 |
| Ex. 25 | MMA 70 EHA 5 | PM 25 | Thiosalicylic acid 1.0 | n-octyl-amine 0.3 | PMA 0.9 | 0 | T-328 0.5 | 20 | 0.5 | 3 | 3.1 | 6.3 | 7.8 |
| Ex. 26 | MMA 70 EHA 5 | PM 25 | Thiosalicylic acid 1.0 | n-octyl-amine 0.2 | PMA 0.9 | 0 | T-328 0.5 | 20 | 0.2 | 3 | 3.5 | 7.5 | 9.8 |
| Ex. 27 | MMA 70 EHA 5 | PM 25 | Thiosalicylic acid 1.0 | n-octyl-amine 0.3 | PMA 1.8 | 0 | T-328 | −20 | 3 | 9 | 2.8 | 5.9 | 6.9 |
| Ex. 28 | MMA 60 EHA 5 | PM 35 | Thiosalicylic acid 1.0 | n-octyl-amine 0.2 | PMA 0.9 | 0 | T-328 | 20 | 0.5 | 3 | 2.9 | 5.8 | 6.9 |
| Ex. 29 | MMA 70 EHA 5 | PM 25 | Thiosalicylic acid 1.0 | n-octyl-amine 11.0 | PMA 0.9 | 0 | T-328 | 20 | 5 | 11 | 4.0 | 9.0 | 12.0 |
| Ex. 30 | MMA 70 EHA 5 | PM 25 | Thiosalicylic acid 1.0 | n-octyl-amine 0.2 | PMA 0.9 | 0 | T-328 | 20 | 7.5 | 13 | 5.0 | 10.5 | 14.9 |
| Ex. 31 | MMA 70 EHA 5 | PM 25 | Thiosalicylic acid 1.0 | Di-n-butyl-amine 0.2 | PMA 0.9 | 0 | T-328 0.5 | 20 | 0.5 | 3 | 2.7 | 4.8 | 5.2 |
| Ex. 32 | MMA 70 EHA 5 | PM 25 | Thiosalicylic acid 1.0 | n-octyl-amine 0.2 | PMA 0.9 | 0 | T-328 | 90 | 0.5 | 3 | 2.7 | 5.8 | 6.8 |
| Ex. 33 | MMA 70 EHA 5 | PM 25 | Thiosalicylic acid 1.0 | n-octyl-amine 0.2 | PMA 0.9 | 0 | T-328 | 20 | 0.8 | 4 | 2.5 | 5.2 | 6.4 |

TABLE 2-continued

| | (A) comp. monofunctional monomer | (B) comp. polymer | (C) comp. sulfur compound | (F) comp. organic amine | (D) comp. peroxide | (E) comp. organometallic compound | (M) UV absorber | Temp. (° C.) | Polymerization behavior Pot life (min) | Polymerization behavior Curing timer (min) | YI 0 hr | YI 100 hr | YI 500 hr |
|---|---|---|---|---|---|---|---|---|---|---|---|---|---|
| Comp. Ex. 5 | MMA 70 EHA 5 | PM 25 | Thiosalicylic acid 1.0 | 0 | PMA 0.9 | 0 | T-328 0.5 | −20 | No gelation | No curing | Not meas. | Not meas. | Not meas. |
| Comp. Ex. 6 | MMA 70 EHA 5 | PM 25 | 0 | DMPT 0.2 | BPO 1.0 | 0 | T-328 0.5 | −20 | 40 | 60 | 14.8 | 23.4 | 25.1 |

Note that the abbreviations used in Table 2 mean the following:
PM: Polymethyl methacrylate
MMA: Methyl methacrylate
EHA: 2-ethylhexylacrylate
3G: Triethylene glycol dimethacrylate
PMA: t-butylperoxymaleic acid
PSA: t-butylperoxysuccinic acid
BPO: Benzoyl peroxide
DMPT: Dimethyl p-toluidine
T-328: Tinuvin 328 (made by Ciba-Geigy, UV absorber)
T-P: Tinuvin P (made by Ciba-Geigy, UV absorber)

EXAMPLE 34

| A mixture comprised of | |
|---|---|
| Methyl methacrylate | 70 parts |
| 2-ethylhexyl acrylate | 5 parts |
| Triethyleneglycol dimethacrylate | 5 parts |
| Dioctyl terephthalate | 1.5 parts |
| Paraffin wax (melting point 47° C.) | 0.25 part |
| Paraffin wax (melting point 66° C.) | 0.25 part | was warmed to 50° C., 25 parts of polymethyl methacrylate were added a little at a time and made to dissolve while stirring, then the mixture was cooled to room temperature to obtain an acrylic resin syrup. Next, under conditions of 20° C., 1.0 part of thiosalicylic acid, 0.01 part of n-octylamine, and 2,2,6,6-tetramethyl-1-piperidinyloxy (hereinafter referred to as "TMPO") were added to this and stirred for mixing.

Next, 0.9 part of t-butylperoxymaleic acid (hereinafter called "PMA") was added to prepare an acrylic resin syrup composition. This was stirred, then quickly coated on a polyethylene terephthalate (hereinafter called "PET") film at 20° C. to give a thickness of about 3 mm. As a result, a pot life of about 15 minutes was obtained and the composition cured in about 40 minutes after the addition of the PMA.

The YI of the obtained cured covering was 2.4. The YI after the weathering resistance test was 5.2 after 100 hours and 6.5 after 500 hours.

EXAMPLES 35 to 47

Except for changing the composition of the acrylic resin syrup composition and the composition of the polymerization initiator to those shown in Table 3, the same procedure as in Example 18 was repeated to obtain a cured covering and measure the YI, pot life, and curing time.

The results are shown in Table 3.

Comparative Example 7

| A mixture comprised of | |
|---|---|
| Methyl methacrylate | 70 parts |
| 2-ethylhexyl acrylate | 5 parts |
| Triethyleneglycol dimethacrylate | 5 parts |
| Dioctyl terephthalate | 1.5 parts |
| Paraffin wax (melting point 47° C.) | 0.25 part |
| Paraffin wax (melting point 66° C.) | 0.25 part | was warmed to 50° C., 25 parts of polymethyl methacrylate were added a little at a time and made to dissolve while stirring, then the mixture was cooled to room temperature to obtain an acrylic resin syrup. Next, 1.0 part of thiosalicylic acid was added and stirred for mixture.

Next, 0.9 of PMA was added to prepare an acrylic resin syrup composition. This was stirred, then quickly coated on a PET film at −20° C. to give a thickness of about 3 mm. As a result, while the gelation was seen after the elapse of about 60 minutes after the addition of the PMA, complete curing did not occur.

EXAMPLE 48

Except for casting the composition prepared in Example 34 into a mold of 150×150×3 mm size and causing polymerization at 40° C., the same procedure as in Example 34 was repeated. As a result, a pot life of about 11 minutes was obtained, the curing time was about 20 minutes, and the YI was 2.2 Further, the YI after a weathering resistance test of the cured covering was 5.0 after 100 hours and 6.3 after 500 hours.

EXAMPLE 49

Except for coating the PET film to a thickness of 0.5 mm, the same procedure as in Example 34 was repeated. As a result, a pot life of about 20 minutes was obtained, the curing time was about 45 minutes, and the YI was 2.0. Further, the YI after a weathering resistance test of the cured covering was 4.9 after 100 hours and 6.2 after 500 hours.

TABLE 3

| | Resin composition (parts by weight) | | | | | | | | | | Polymerization behavior | | YI | | |
|---|---|---|---|---|---|---|---|---|---|---|---|---|---|---|---|
| | (A) comp. monofunctional monomer | (B) comp. polymer | (C) comp. TEMPO | (F) comp. organic amine | (D) comp. peroxide | (H) comp. sulfur compound | (I) comp. metal compound | H₂O | (M) UV absorber | Temp. (°C.) | Pot life (min) | Curing time (min) | 0 hr | 100 hr | 500 hr |
| Ex. 34 | MMA 70 EHA 5 | PM 25 | 0.2 | n-octyl-amine 0.01 | PMA 0.9 | Thiosalicylic acid 1.0 | 0 | 0 | T-328 0.5 | 20 | 15 | 40 | 2.4 | 5.2 | 6.5 |
| Ex. 35 | MMA 70 EHA 5 | PM 25 | 0.4 | n-octyl-amine 0.01 | PMA 0.9 | Thiosalicylic acid 1.0 | 0 | 0 | T-328 0.5 | 20 | 20 | 70 | 2.6 | 5.4 | 6.5 |
| Ex. 36 | MMA 70 EHA 5 | PM 25 | 0.05 | n-octyl-amine 0.05 | PMA 0.9 | Thiosalicylic acid 1.0 | 0 | 0 | T-328 0.5 0.5 | −20 | 20 | 70 | 2.5 | 5.4 | 6.6 |
| Ex. 37 | MMA 70 EHA 5 | PM 25 | 0.08 | n-octyl-amine 0.02 | PMA 0.9 | Thiosalicylic acid 1.0 | 0 | 0 | T-328 0.5 | −20 | 23 | 45 | 2.7 | 5.4 | 6.6 |
| Ex. 38 | MMA 70 EHA 5 | PM 25 | 0.2 | n-octyl-amine 0.01 | PMA 0.9 | Thiosalicylic acid 1.0 | 0 | 0 | T-328 0.5 | 20 | 15 | 40 | 2.5 | 5.3 | 6.7 |
| Ex. 39 | MMA 70 EHA 5 | PM 25 | 0.3 | Di-n-butyl-amine 0.05 | PMA 0.9 | Thiosalicylic acid 1.0 | 0 | 0 | T-328 0.5 | 20 | 18 | 45 | 2.2 | 4.8 | 5.8 |
| Ex. 40 | MMA 70 EHA 5 | PM 25 | 0.2 | n-octyl-amine 0.01 | PMA 0.9 | Thiosalicylic acid 1.0 | Al(acac)3 0.2 | 0 | T-328 0.5 | 20 | 13 | 37 | 2.8 | 6.7 | 8.8 |
| Ex. 41 | MMA 70 EHA 5 | PM 25 | 0.2 | n-octyl-amine 12 | PMA 0.9 | Thiosalicylic acid 1.0 | 0 | 0 | T-328 0.5 | 20 | 11 | 42 | 3.9 | 8.9 | 12.1 |
| Ex. 42 | MMA 70 EHA 5 | PM 25 | 0.4 | n-octyl-amine 0.4 | PMA 0.9 | THEIC-BMPA 0.5 | Ca(OH)₂ 0.5 | 0 | 0 | 20 | 13 | 35 | 2.1 | 4.8 | 6.4 |
| Ex. 43 | MMA 70 EHA 5 | PM 25 | 0.02 | n-octyl-amine 0.1 | PMA 0.9 | THEIC-BMPA 0.5 | Ca(OH)₂ 0.5 | 0 | 0 | −20 | 25 | 50 | 2.1 | 3.2 | 5.0 |
| Ex. 44 | MMA 70 EHA 5 | PM 25 | 0.02 | n-octyl-amine 0.2 | PMA 0.9 | THEIC-BMPA 0.5 | Ca(OH)₂ 0.5 | 0 | 0 | −20 | 20 | 45 | 2.4 | 4.4 | 6.0 |
| Ex. 45 | MMA 70 EHA 5 | PM 25 | 0.02 | n-octyl-amine 0.1 | PMA 0.9 | THEIC-BMPA 0.5 | Ca(OH)₂ 0.5 | 0.2 | 0 | −20 | 22 | 30 | 2.2 | 3.5 | 5.4 |
| Ex. 46 | MMA 70 EHA 5 | PM 25 | 0.02 | n-octyl-amine 0.2 | PMA 0.9 | THEIC-BMPA 0.5 | Mg(OH)₂ 0.5 | 0 | 0 | −20 | 35 | 65 | 2.3 | 4.8 | 6.3 |
| Ex. 47 | MMA 70 EHA 5 | PM 25 | 0.02 | n-octyl-amine 0.2 | PMA 0.9 | OTG 0.5 | Mg(OH)₂ 0.5 | 0 | 0 | −20 | 35 | 65 | 2.0 | 3.1 | 4.8 |
| Ex. 48 | MMA 70 EHA 5 | PM 25 | 0.2 | n-octyl-amine 0.01 | PPM 0.9 | Thiosalicylic acid 1.0 | 0 | 0 | T-328 0.5 | 40 | 11 | 20 | 2.2 | 5.0 | 6.3 |
| Ex. 49 | MMA 70 EHA 5 | PM 25 | 0.2 | n-octyl-amine 0.01 | PMA 0.9 | Thiosalicylic acid 1.0 | 0 | 0 | T-328 0.5 | 20 | 20 | 45 | 2.0 | 4.9 | 6.2 |
| Comp. Ex. 7 | MMA 70 EHA 5 | PM 25 | 0 | 0 | PMA 0.9 | Thiosalicylic acid 1.0 | 0 | 0 | T-328 0.5 | −20 | No curing | No curing | Not meas. | Not meas. | Not meas. |

Note that the abbreviations used in Table 3 mean the following:
PM: Polymethyl methacrylate
MMA: Methyl methacrylate
EHA: 2-ethylhexylacrylate
3G: Triethylene glycol dimethacrylate
AL (acac)₃: An ammonium complex of acetylacetone
OTG: 2-ethylhexyl thioglycolate
PMA: t-butylperoxymaleic acid
PSA: t-butylperoxysuccinic acid
THEIC-BMPA: Tris (2-hydroxyethyl)isocyanulate tris (3-mercaptopropionate)
T-328: Tinuvin 328 (made by Ciba-Geigy, UV absorber)
TEMPO: 2,2,6,6-tetramethyl-1-piperidinyloxy In Comparative Example 7, since the component (G) and the component (F) were not used, gelation occurred after the elapse of 60 minutes at −20° C., but the material did not cure completely and therefore the YI could not be measured.

INDUSTRIAL APPLICABILITY

The present invention provides a resin composition which is free from yellowing of the cured covering, is controlled in pot life (installation time), and is able to be suitably used for civil engineering and construction applications requiring polymerization and curing into a thin film state in a short time such as for coating and covering concrete, asphalt, or other road surfaces or floor or wall surfaces and therefore is extremely beneficial in industry.

What is claimed is:

1. A resin composition which comprises:
   (A) a (meth)acrylic acid ester,
   (B) a (meth)acrylic polymer soluble in the component (A), and
   (C) thiosalicylic acid, and
   (D) at least one peroxy ester selected from the group consisting of t-butyl peroxymaleic acid, t-amyl peroxy maleic acid, t-butyl peroxysuccinic acid and t-amyl peroxysuccinic acid, wherein
   the proportion of the component (A) is 40 to 90 parts by mass, the proportion of the component (B) is 10 to 60 parts by mass, the proportion of the component (C) is 0.05 to 10 parts by mass, and the proportion of component (D) is 0.01 to 15 parts by mass, based on 100 parts by mass of the total weight of component (A) and component (B).

2. The resin composition of claim 1, further comprising a complex (E) of aluminum and an organic compound selected from the group consisting of acetylacetone, phenylacetylacetone, and 2,2,6,6-tetramethyl-3,5-heptadione.

3. A resin composition which comprises:
   (A) a (meth)acrylic acid ester,
   (B) a (meth)acrylic polymer soluble in the component (A),
   (C) thiosalicylic acid, and
   (D) at least one peroxy ester selected from the group consisting of t-butyl peroxymaleic acid, t-amyl peroxymaleic acid, t-butyl peroxysuccinic acid, t-amyl peroxysuccinic acid and
   (F) an organic amine selected from the group consisting of n-octylamine, laurylamine, dibutylamine, tributylamine, N,N-dimethyl-p-toluidine, N,N-diisopropyrrole p-toluidine, dimethylaniline, phenetyldibutylamine, sulfanilic acid, N,N-diglycidyl aniline, anthranilic acid, acetoguanamine, 3-amino-1,2,4-trizaole, benzoguanamine and melamine.

4. The resin composition of claim 3, wherein the proportion of the component (A) is 40 to 90 parts by mass, the proportion of the component (B) is 10 to 60 parts by mass, and based on 100 parts by mass of the total component (A) and component (B), the proportion of the component (C) is 0.05 to 15 parts by mass and the proportion of the component (F) is 0.001 to 10 parts by mass.

5. A resin composition which comprises:
   (A) a (meth)acrylic acid ester,
   (B) a (meth)acrylic polymer soluble in the component (A),
   (D) at least one peroxy ester selected from the group consisting of t-butyl peroxymaleic acid, t-amyl peroxy maleic acid, t-butyl peroxysuccinic acid, and t-amyl peroxysuccinic acid,
   (F) an organic amine selected from the group consisting of n-octylamine, laurylamine, dibutylamine, tributylamine, N,N-dimethyl-p-toluidine, N,N-diisopropyrrole p-toluidine, dimethylaniline, phenethyl dibutylamine, sulfanilic acid, N,N-diglycidyl aniline, anthranilic acid, acetoguanamine, 3-amino-1,2,4-triazole, benzoguanamine, and melamine,
   (G) a radical trapping agent, and
   (H) thiosalicylic acid and/or tris(2-hydroxyethyl) isocyanulate tris(3mercaptopropionate).

6. The resin composition of claim 5, where the proposition of the component (A) is 40 to 90 parts by mass, the proportion of the component (B) is 10 to 60 parts by mass, and, based on 100 parts by mass of the total weight of these component (A) and (B), the proportion of the component (D) is 0.01 to 15 parts by mass, the proportion of component (G) is 0.001 to 3 parts by mass, and the proportion of the component (F) is 0.001 to 10 parts by mass.

7. A resin composition as set forth in claim 5, wherein the radical trapping agent (G) is at least one member selected from stable nitroxy radicals.

8. The resin composition of claim 5, further comprising a metal compound (I) wherein said metal compound (I) comprises a metal selected from the group consisting of metals of Groups IA and IIA of the Periodic Table, zinc, lead, cobalt, nickel, manganese, iron, and copper, and is a compound or organometallic complex of the metal and an organic compound.

9. The resin composition of claim 1, further comprising a filler.

10. The resin composition of claim 3, further comprising a filler.

11. The resin composition of claim 5, further comprising a filler.

12. The resin composition of claim 1, further comprising a plasticizer.

13. The resin composition of claim 3, further comprising a plasticizer.

14. The resin composition of claim 5, further comprising a plasticizer.

15. The resin composition of claim 1, further comprising a UV absorber.

16. The resin composition of claim 3, further comprising a UV absorber.

17. The resin composition of claim 5, further comprising a UV absorber.

18. A resin composition which comprises:
   (A) a (meth)acrylic acid ester,
   (B) a (meth)acrylic polymer soluble in the component (A), and
   (C) thiosalicylic acid, and
   (D) at least one peroxide, wherein
   the proportion of the component (A) is 40 to 90 parts by mass, the proposition of the component (B) is 10 to 60 parts by mass, the proportion of the component (C) is 0.05 to 10 parts by mass, based on 100 parts by mass of the total weight of component (A) and component (B).

* * * * *